US012739087B2

(12) United States Patent
Mizutani

(10) Patent No.: US 12,739,087 B2
(45) Date of Patent: Sep. 15, 2026

(54) COMMUNICATION NETWORK SYSTEM

(71) Applicant: TOYOTA JIDOSHA KABUSHIKI KAISHA, Toyota (JP)

(72) Inventor: Taiki Mizutani, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 19/079,732

(22) Filed: Mar. 14, 2025

(65) Prior Publication Data

US 2025/0373399 A1 Dec. 4, 2025

(30) Foreign Application Priority Data

Jun. 3, 2024 (JP) ................................. 2024-090125

(51) Int. Cl.

| | |
|---|---|
| ***H04L 5/00*** | (2006.01) |
| ***H04L 12/40*** | (2006.01) |
| ***H04L 41/0896*** | (2022.01) |

(52) U.S. Cl.

CPC ............ *H04L 5/0094* (2013.01); *H04L 12/40* (2013.01); *H04L 41/0896* (2013.01); *H04L 2012/40215* (2013.01); *H04L 2012/40273* (2013.01)

(58) Field of Classification Search

CPC ... H04L 5/0094; H04L 12/40; H04L 41/0896; H04L 2012/40215

See application file for complete search history.

(56) References Cited

U.S. PATENT DOCUMENTS

| | | | | |
|---|---|---|---|---|
| 2009/0213870 | A1* | 8/2009 | Terasawa | H04L 12/417 370/442 |
| 2018/0212797 | A1* | 7/2018 | Haenger | H04L 12/40169 |
| 2021/0306177 | A1* | 9/2021 | Fredriksson | H04L 12/40104 |

FOREIGN PATENT DOCUMENTS

| | | |
|---|---|---|
| JP | 2018-522487 A | 8/2018 |

* cited by examiner

*Primary Examiner* — Hieu T Hoang

(74) *Attorney, Agent, or Firm* — Oliff PLC

(57) ABSTRACT

It comprises a plurality of ECU configured to transmit and receive static and dynamic messages over a communication bus. Each of the plurality of ECU sets an upper limit of the number of dynamic messages to be transmitted to the communication bus per unit time to the number of dynamic messages that can be transmitted in a distribution amount to itself of the second bandwidth. Each of the plurality of ECU adjusts the transmission of the dynamic message to the communication bus such that the number of dynamic messages to be transmitted to the communication bus per unit time does not exceed the above upper limit.

3 Claims, 4 Drawing Sheets

COMMUNICATION NETWORK SYSTEM

CROSS-REFERENCE TO RELATED APPLICATION

This application claims priority to Japanese Patent Application No. 2024-090125 filed on Jun. 3, 2024, incorporated herein by reference in its entirety.

BACKGROUND

1. Technical Field

The present disclosure relates to a communication network system including a plurality of electronic control devices.

2. Description of Related Art

Japanese Unexamined Patent Application Publication (Translation of PCT Application) No. 2018-522487 (JP 2018-522487 A) discloses a system including a plurality of subscriber stations and a communication connection. Each of the subscriber stations may transmit and receive dynamic messages in addition to transmitting and receiving static messages via the communication connection. This allows the system to also perform communication that was not assumed at the design stage of the system.

SUMMARY

When the software of the subscriber stations is updated or new software is introduced to the subscriber stations, the number of dynamic messages transmitted by the subscriber stations to the communication connection per unit time may increase. In the system described above, the communication load on the system increases as the number of dynamic messages transmitted from the subscriber stations to the communication connection per unit time increases. If the communication load on the system becomes excessive, the communication quality of the system may deteriorate.

An aspect provides a communication network system including a plurality of electronic control devices configured to be able to transmit and receive static messages and dynamic messages via a communication bus.

In the communication network system, a total sum of data lengths of the static messages transmitted to the communication bus per unit time does not exceed a first bandwidth, of a bandwidth of the communication bus; and a second bandwidth that is the bandwidth of the communication bus excluding the first bandwidth is allocated to the electronic control devices as a bandwidth for communication of the dynamic messages.

Each of the electronic control devices is configured to set an upper limit of the number of the dynamic messages to be transmitted to the communication bus per unit time to the number of the dynamic messages allowed to be transmitted using an amount of the second bandwidth allocated to the electronic control device itself, and coordinate transmission of the dynamic messages to the communication bus such that the number of the dynamic messages transmitted to the communication bus per unit time does not exceed the upper limit.

According to the above system, it is possible to suppress deterioration in communication quality even if the types of dynamic messages to be transmitted and received among a plurality of electronic control devices increase.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment of a communication network system will be described with reference to FIG. 1 to FIG. 6.

Figure 1:
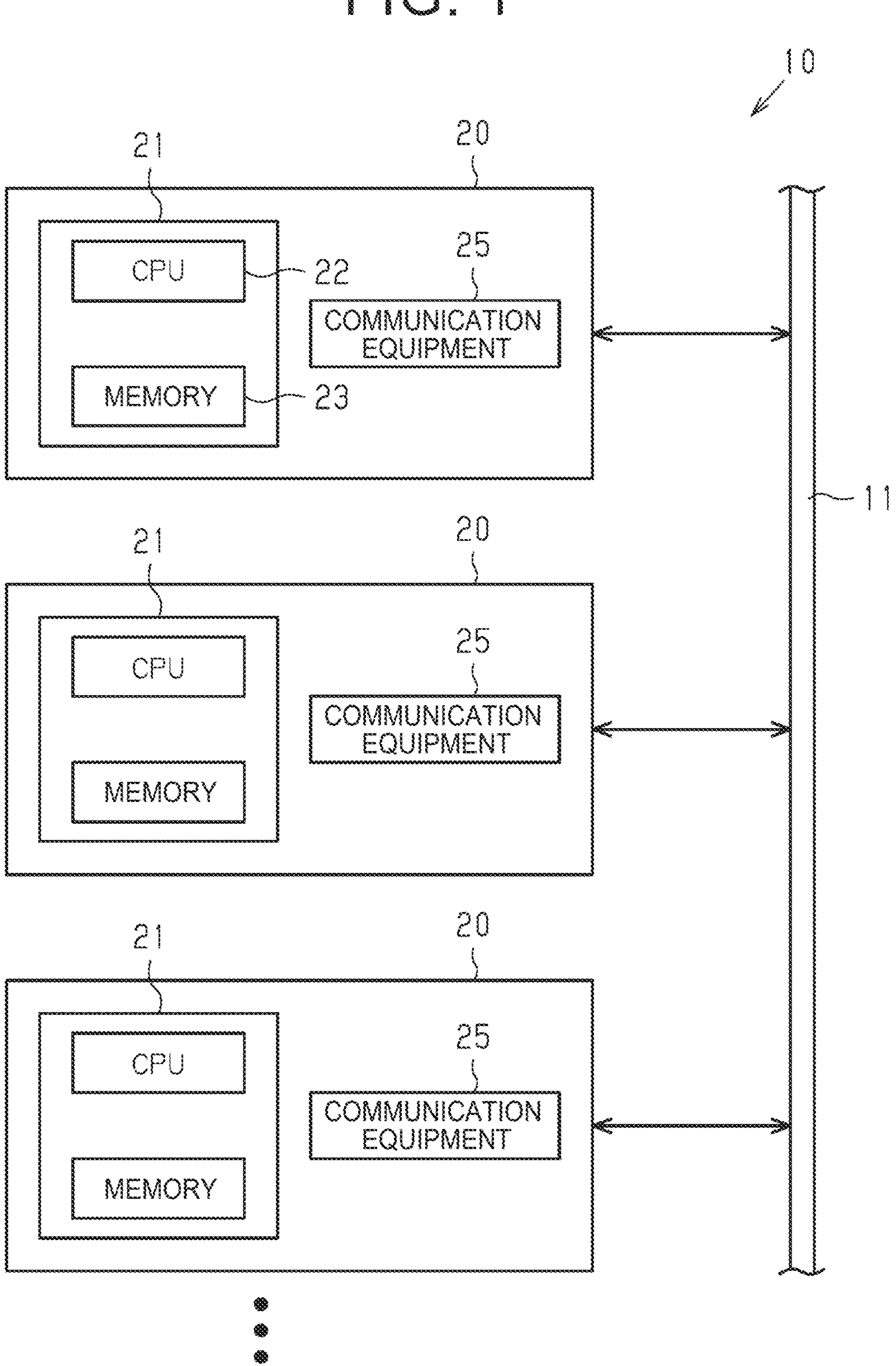
FIG. 1 is a block diagram illustrating a communication network system according to a first embodiment.

First, a configuration of a communication network system will be described. FIG. 1 shows a communication network system 10 mounted on a vehicle. The communication network system 10 comprises a plurality of Electronic Control Unit (ECU) 20. Each of the plurality of electronic control devices 20 is configured to transmit and receive messages via the communication bus 11. Hereinafter, the communication network system 10 is simply referred to as a "system 10". An exemplary communication bus 11 is a Control Area Network (CAN) bus.

The plurality of ECU 20 includes an ECU for controlling an in-vehicle actuator such as a braking device, an ADAS-ECU, and the like. ECU 20 includes a processing circuit 21 and a communicator 25. ECU 20 can send messages to the communication bus 11 via the communicator 25. ECU 20 can receive messages from the communication bus 11 via the communicator 25.

The plurality of processing circuits 21 each include a CPU 22 and a memory 23. The memories 23 store various control programs executed by CPU 22. When CPU 22 executes the control program of the memory 23, the processing circuit 21 can provide a service corresponding to the control program.

Message

Figure 2:
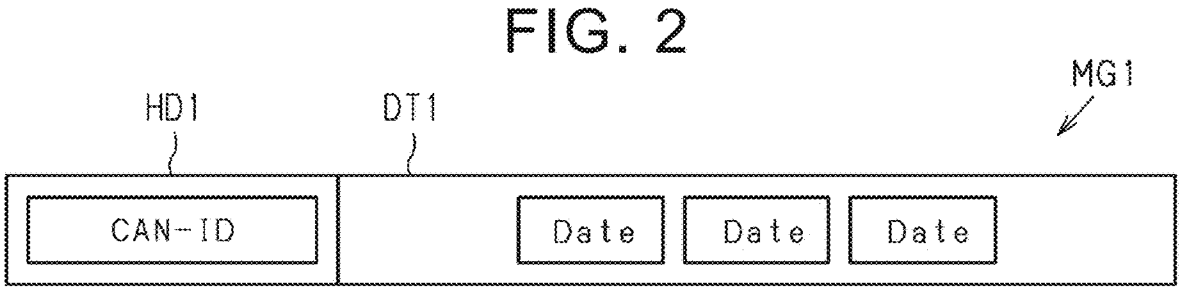
FIG. 2 is a schematic diagram illustrating a data configuration of a static message.
Figure 3:
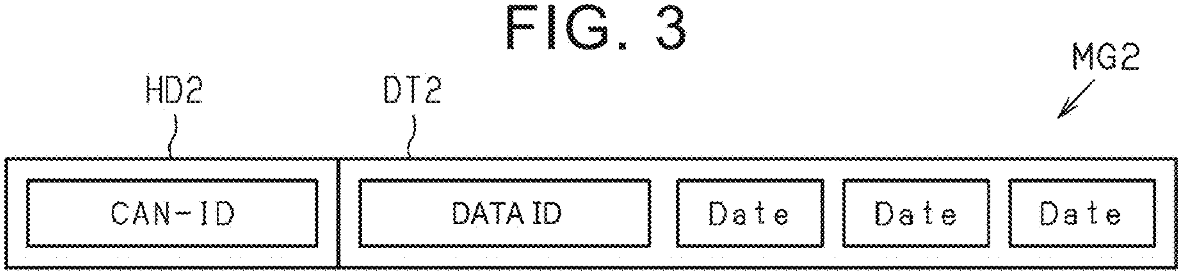
FIG. 3 is a schematic diagram illustrating a data configuration of a dynamic message.

Referring to FIGS. 2 and 3, a message transmitted from ECU 20 to the communication bus 11 will be described.

The message includes a static message MG1 and a dynamic message MG2. The static message MG1 is a message that is supposed to be transmitted from ECU 20 to the communication bus 11 at the designing stage of the system 10. The dynamic message MG2 is a message which is not expected to be transmitted from ECU 20 to the communication bus 11 at the designing stage of the system 10. For example, when the control program of the memory 23 is updated, the contents of the service that the system 10 can provide may be changed. When the content of the service is changed, the type of message transmitted from ECU 20 to the communication bus 11 may increase. Further, for example, when a new control program is added to the memory 23, the type of service that the system 10 can provide may increase. As the number of types of services increases, the number of types of messages transmitted from ECU 20 to the communication bus 11 may increase. In this way, a message that increases due to a change in the content of a service or an increase in the number of services corresponds to a dynamic message.

FIG. 2 shows the structure of a static-message MG1. The data length of the static-message MG1 is fixed by the specified data length. The static-message MG1 includes a header area HD1 and a data area DT1. The header area HD1 includes a CAN-ID. CAN-ID is an ID for identifying the content of the message and ECU of the destination. The data area DT1 includes at least one piece of data to be communicated to other ECU 20 by sending a static-message MG1.

FIG. 3 shows the structure of a dynamic message MG2. The data length of the dynamic message MG2 is equal to the static message MG1. The dynamic-message MG2 includes a header area HD2 and a data area DT2. The header area HD2 includes a CAN-ID.

The data area DT2 includes at least one piece of data to be communicated to the other ECU 20 by sending a dynamic-message MG2. The data area DT2 includes a data ID. The data ID is, for example, an ID for identifying the type of the dynamic message or identifying ECU to which the dynamic message is sent.

Communication Using a Communication Bus

Figure 4:
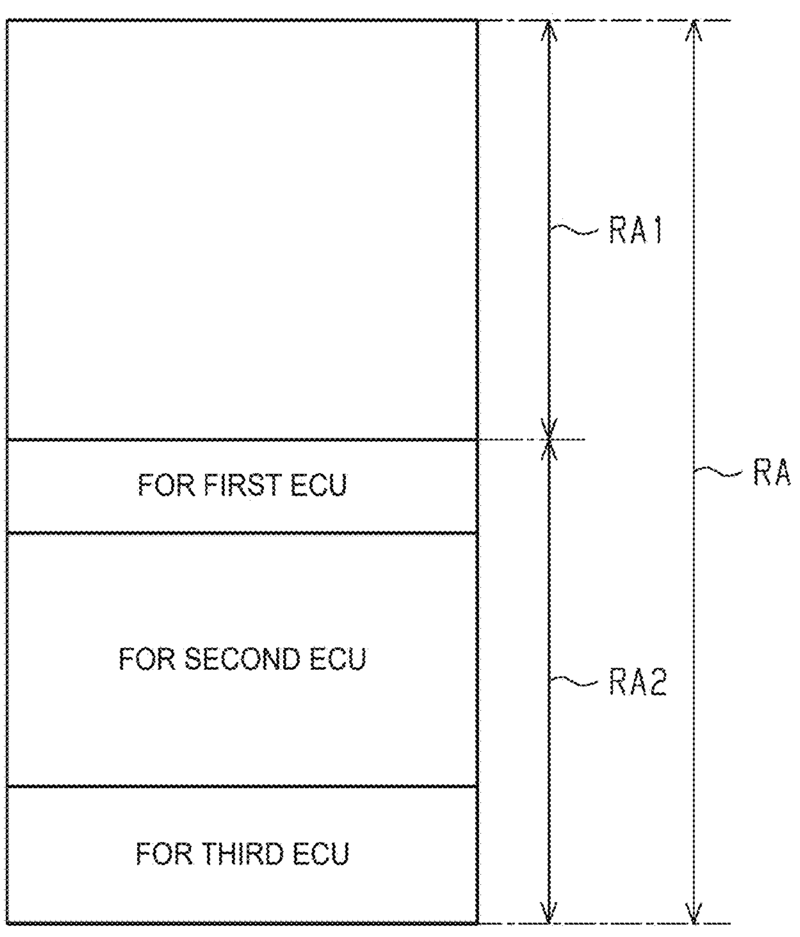
FIG. 4 is a schematic diagram illustrating a bandwidth allocation of a communication bus constituting the communication network system of FIG. 1.

FIG. 4 shows a bandwidth RA of the communication bus 11. The bandwidth RA of the communication bus 11 is the largest amount of data that can be transmitted by the communication bus 11 per unit time. The bandwidth RA includes a first bandwidth RA1 and a second bandwidth RA2. The magnitude of the first bandwidth RA1 and the second bandwidth RA2 are determined in the configuration stage of the system 10.

The first bandwidth RA1 is the amount of data reserved for transmitting the static-message MG1. The first bandwidth RA1 is set such that the sum of the data lengths of the static-message MG1 transmitted to the communication bus 11 per unit-time does not exceed the first bandwidth RA1.

The second bandwidth RA2 is the amount of data reserved for transmitting the dynamic-message MG2. Of the bandwidth RA of the communication bus 11, the bandwidth excluding the first bandwidth RA1 is the second bandwidth RA2. As described above, the data length of the dynamic-message MG2 is determined in advance. The second bandwidth RA2 is also predetermined. Therefore, it can be said that the upper limit of the number of dynamic-message MG2 that can be transmitted to the communication bus 11 per unit time is determined.

For example, as shown in FIG. 4, the second bandwidth RA2 is allocated to a plurality of ECU 20. When the control program is updated by at least one of the plurality of ECU 20 or the control program is added, the allocation amounts of the second bandwidth RA2 to the plurality of ECU 20 are changed.

Process of Sending Messages

Figure 5:
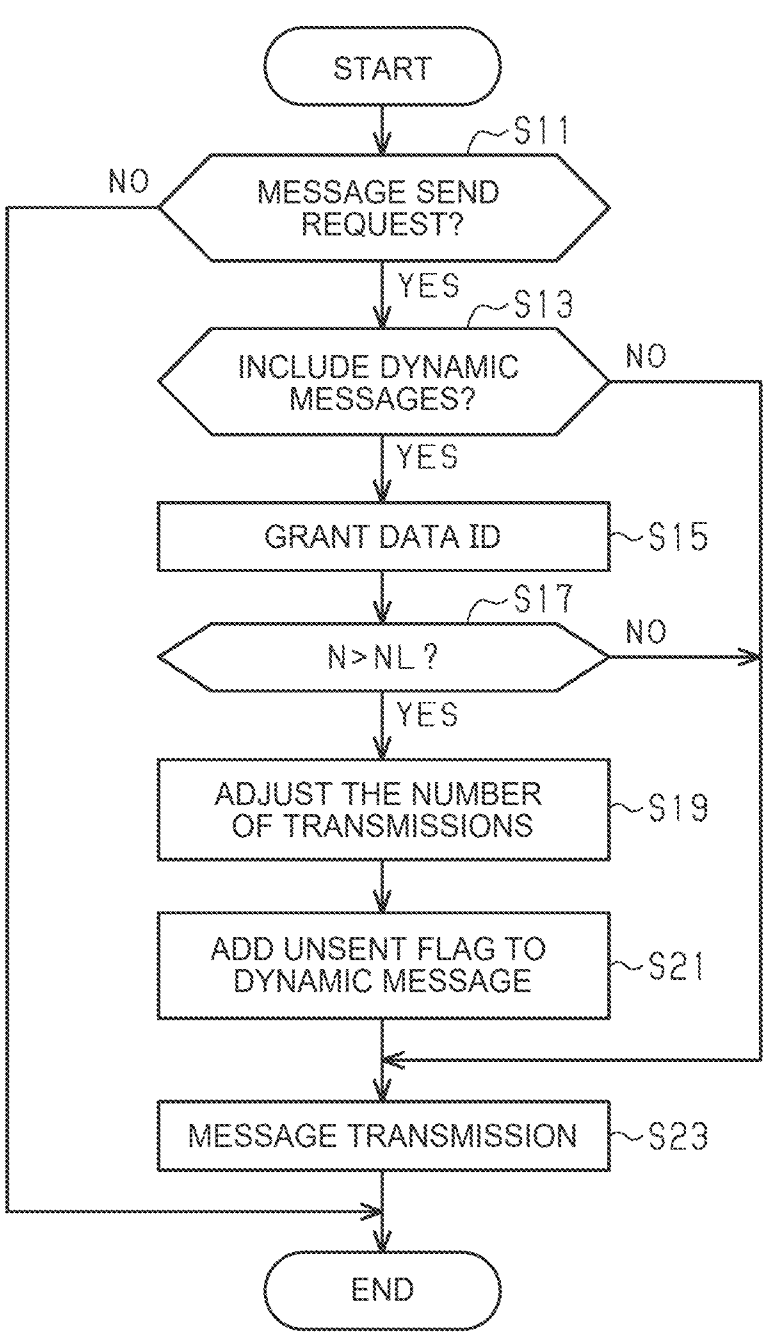
FIG. 5 is a flowchart illustrating a series of processes executed by the electronic control device when a message is transmitted to a communication bus in the communication network system according to the first embodiment.

Referring to FIG. 5, a series of processes executed by CPU 22 to transmit messages MG1, MG2 to the communication bus 11 will be described. CPU 22 repeatedly executes the series of processes at predetermined control cycles.

In S11, CPU 22 determines whether there is a need to send a message. If there is a request to send a message (S11: YES), CPU 22 proceeds to S13. When there is no message-sending request (S11: NO), CPU 22 ends the series of processes once.

In S13, CPU 22 determines whether the message to be transmitted includes a dynamic message MG2. If the message to be sent contains a dynamic message MG2 (S13: YES), CPU 22 proceeds to S15. If the message to be sent does not include a dynamic message MG2 (S13: NO), CPU 22 proceeds to S23.

In S15, CPU 22 assigns a data ID to the generated dynamic-message MG2. For example, CPU 22 adds the data ID to the data area DT2 of the generated dynamic-message MG2.

In a subsequent S17, CPU 22 obtains, from the generated dynamic message MG2, the number N of unsent messages, which is the number of dynamic message MG2 that have not yet been transmitted to the communication bus 11. Then, CPU 22 determines whether or not the number N of unsent messages is larger than the upper limit NL.

Here, the "upper limit NL" is an upper limit of the number of dynamic messages MG2 transmitted per unit-time set for ECU 20 in which the series of processes illustrated in FIG. 5 is executed. The data length of the dynamic-message MG2 is fixed. Therefore, in the second bandwidth RA2, the larger the bandwidth allocated to ECU 20 is, the larger is set to the upper limit NL.

When the number N of unsent messages is greater than the upper limit NL (S17: YES), CPU 22 shifts the process to S19. When the number N of unsent messages is equal to or smaller than the upper limit NL (S17: NO), CPU 22 shifts the process to S23.

In S19, CPU 22 adjusts the number of dynamic-message MG2 to be sent to the communication bus 11 per unit-time. Specifically, CPU 22 determines the same number of dynamic message MG2 as the upper limit NL from the plurality of dynamic message MG2 that have not been transmitted. In a subsequent S21, CPU 22 adds an untransmitted flag to the dynamic message MG2 it decides to send. The unsent flag indicates that there is a dynamic-message MG2 that has not yet been transmitted. For example, CPU 22 sets an unsent flag in the data area DT2 of the dynamic message MG2 that it decides to transmit. Then, CPU 22 shifts the process to S23.

In S23, CPU 22 transmits a message to be transmitted to the communication bus 11. That is, by CPU 22 executing S19 and S23 processes, CPU 22 can adjust the transmission of the dynamic message MG2 to the communication bus 11 so that the number of dynamic message MG2 to be transmitted to the communication bus 11 per unit time does not exceed the upper limit NL. CPU 22 ends the series of processes once the messaging is completed.

Setting of the Above Upper Limit NL

Figure 6:
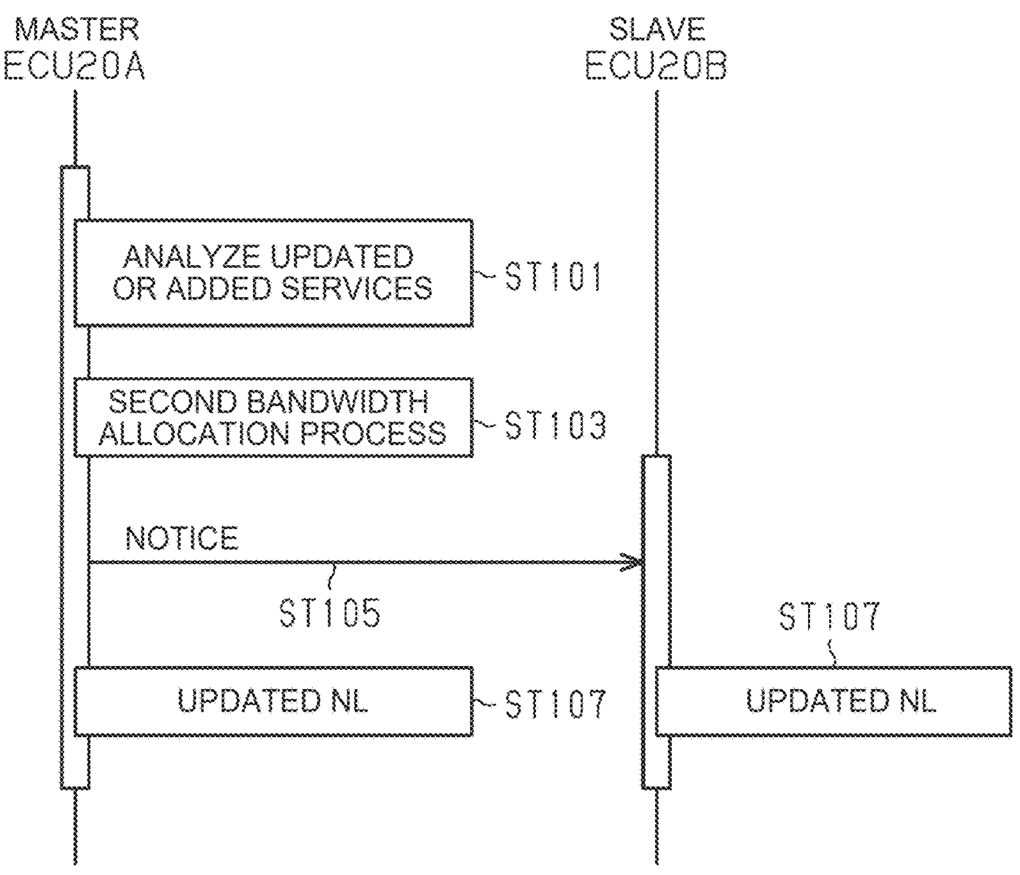
FIG. 6 is a sequence diagram showing a flow of a process for setting an upper limit of the number of dynamical messages to be transmitted to a communication bus per unit time in the communication network system according to the first embodiment.

Referring to FIG. 6, a flow of a process for setting an upper limit NL will be described. One of the plurality of ECU 20 functions as a master ECU 20A. An ECU of the plurality of ECU 20 other than the master ECU 20A functions as a slave ECU 20B. The master ECU 20A has the function of allocating the second bandwidth RA2 to a plurality of ECU 20, while the slave ECU 20B does not have the function. For convenience of explanation, only one of the plurality of slave ECU 20B is illustrated in FIG. 6.

When the control program is updated by at least one ECU 20 of the plurality of ECU 20 or the control program is added, the process illustrated in FIG. 6 is started. Initially, in ST101, in the master ECU 20A, CPU 22 analyzes the updated or added servicing. Specifically, CPU 22 checks whether or not the type of the dynamic-message MG2 transmitted from ECU 20 to the communication bus 11 increases.

In the following ST103, in the master ECU 20A, CPU 22 performs the allocation process of the second bandwidth RA2 based on ST101. For example, CPU 22 allocates to the plurality of ECU 20 the second bandwidth RA2 such that the allocation for ECU 20 of increased types of dynamic-message MG2 to be transmitted to the communication bus 11 is increased.

Then, in ST105, in the master ECU 20A, CPU 22 notifies the slave ECU 20B of the bandwidth allocated to the slave ECU 20B in the second bandwidth RA2.

In a subsequent ST107, in each of the master ECU 20A and the slave ECU 20B, CPU 22 sets an upper limit NL in accordance with the allocation of the second bandwidth RA2 to itself. Specifically, CPU 22 increases the upper limit NL as the allocation of the second bandwidth RA2 to itself increases.

Operation and Effect of the Present Embodiment (1-1) Each of the plurality of ECU 20 sets an upper limit NL of the number of dynamic message MG2 to be transmitted to the communication bus 11 per unit time to the number of dynamic message MG2 that can be transmitted to the second bandwidth RA2 in a distribution to itself. Each of the plurality of ECU 20 adjusts the transmission of the dynamic message MG2 to the communication bus 11 so that the number of dynamic message MG2 to be transmitted to the communication bus 11 per unit time does not exceed the upper limit NL.

As a result, a plurality of messages exceeding the bandwidth RA of the communication bus 11 are suppressed from being transmitted from the plurality of ECU 20 to the communication bus 11. Thus, the communication load of the system 10 is suppressed from becoming excessively large. In addition, the first bandwidth RA1 for transmitting the static-message MG1 is reserved in the system 10. Therefore, even if the type of the dynamic message MG2 to be transmitted is increased, the static message MG1 can be transmitted and received among the plurality of ECU 20. Therefore, even if the number of types of dynamic-message MG2 to be transmitted and received among a plurality of ECU 20 increases, the communication quality can be suppressed from deteriorating in the system 10.

(1-2) Each of the plurality of ECU 20 adds an unsent flag to the dynamic message MG2 to be transmitted when a part of the unsent dynamic message MG2 is transmitted to the communication bus 11 in a situation where the number of unsent dynamic message MG2 is larger than the upper limit NL among the generated dynamic message MG2. Each of the plurality of ECU 20 transmits a dynamic-message MG2 to which the unsent flag is added to the communication bus.

Thus, it is possible to recognize that there is a dynamic message MG2 that has not yet been transmitted by ECU 20 that has received the dynamic message MG2. In other words, ECU 20 can recognize that the content of the dynamic message MG2 received this time may not be up-to-date.

Second Embodiment

A second embodiment of a communication network system will be described with reference to FIG. 7. The second embodiment is different from the first embodiment in that a part of the unsent dynamic message can be deleted. In the following description, portions different from those of the first embodiment will be mainly described, and the same components as those of the first embodiment will be denoted by the same reference numerals, and redundant description will be omitted.

In each of the plurality of ECU 20 of the system 10 according to the present embodiment, the dynamic message MG2 satisfying the predetermined deletion condition is deleted from the unsent dynamic message MG2. That is, the dynamic-message MG2 satisfying the predetermined deletion condition is deleted from ECU 20 without being transmitted to the communication bus 11.

Dynamic Message Deletion Processing

Figure 7:
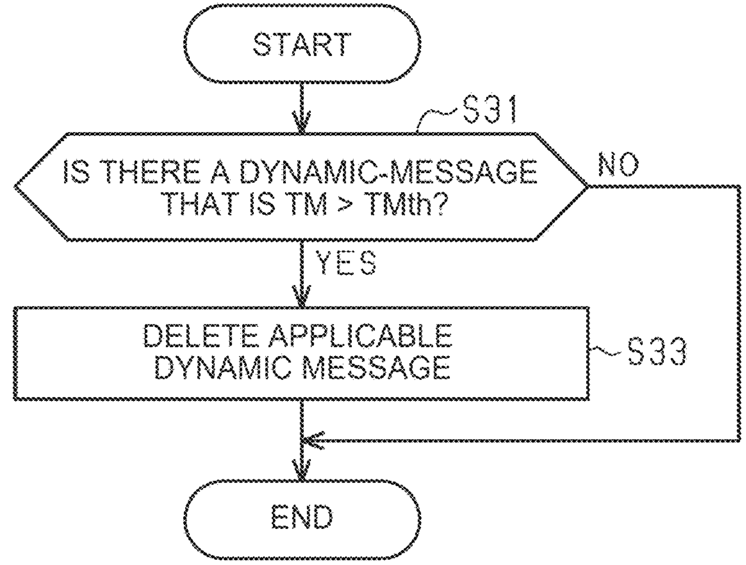
FIG. 7 is a flowchart illustrating a series of processes executed by the electronic control device to delete a dynamic message in which a predetermined deletion condition is satisfied in the communication network system according to the second embodiment.

Referring to FIG. 7, a series of processes performed by CPU 22 for deleting a dynamic-message MG2 will be described. CPU 22 repeatedly executes the series of processes at predetermined control cycles.

In S31, CPU 22 determines whether there is a dynamic message MG2 in which the elapsed time TM from the time of generation exceeds a predetermined time TMth in the dynamic message MG2 that cannot be transmitted. The longer the elapsed time TM, the older the content of the dynamic message MG2. Therefore, a predetermined-time TMth is set as a criterion for determining whether or not the content of the dynamic-message MG2 is out of date.

If there is a dynamic-message MG2 whose elapsed time TM exceeds the predetermined time TMth (S31: YES), CPU 22 proceeds to S33. If there is no dynamic-message MG2 whose elapsed time TM exceeds the predetermined time TMth (S31: NO), CPU 22 ends the series of processes once.

In S33, CPU 22 deletes the dynamic-message MG2 whose elapsed time TM exceeds the predetermined time TMth. Then, CPU 22 ends the series of processes once. The operation and effects of the present embodiment are as follows. In the system 10 of the present embodiment, in addition to the effects of the first embodiment, the following effects can be further obtained.

(2-1) Each of the plurality of ECU 20 deletes a dynamic-message MG2 that has not been transmitted to the communication bus 11 even if the elapsed time TM since generation exceeds a predetermined time TMth. In this way, it is possible to prevent the old-dynamic-message MG2 from being transmitted to other ECU 20 in the system 10.

Modifications

The above-described embodiments can be modified as follows. The above-described embodiments and the following modifications can be combined with each other as long as they are not technically contradictory.

In the above embodiments, CPU 22 may not add an unsent flag to the dynamic message MG2 to be transmitted to the communication bus 11.

The number of ECU constituting the system 10 may be three or more as long as the number is two or more.

ECU 20 includes a CPU and a ROM, and is not limited to executing a software-process. That is, ECU 20 may have any of the following configurations (a), (b), and (c).

(a) ECU 20 includes one or more processors that execute various processes in accordance with a computer program. The processor includes CPU and memories such as RAM and ROM. The memory stores a program code or an instruction configured to execute the CPU to perform processes. Memory, or computer readable media, includes any available media that can be accessed by a general purpose or special purpose computer.

(b) ECU 20 includes one or more dedicated hardware circuitry for performing various processes. Dedicated hardware circuits can include, for example, application-specific integrated circuits, i.e., Application Specific Integrated Circuit (ASIC) or Field Programmable Gate Array (FPGA).

(c) ECU 20 includes one or more processors that execute some of the various processes in accordance with a computer program, and one or more hardware circuitry dedicated to executing the remaining of the various processes.

It should be noted that the expression "at least one" as used herein means "one or more" of the desired options. As an example, the expression "at least one" as used herein means "only one option" or "both of two options" if the number of options is two. As another example, the expression "at least one" as used herein means "only one option" or "any combination of two or more options" if the number of options is three or more.

What is claimed is:

1. A communication network system comprising a plurality of electronic control devices configured to be able to transmit and receive static messages and dynamic messages via a communication bus, wherein:

a total sum of data lengths of the static messages transmitted to the communication bus per unit time does not exceed a first bandwidth, of a bandwidth of the communication bus;

a second bandwidth that is the bandwidth of the communication bus excluding the first bandwidth is allocated to the electronic control devices as a bandwidth for communication of the dynamic messages; and each of the electronic control devices is configured to set an upper limit of the number of the dynamic messages to be transmitted to the communication bus per unit time to the number of the dynamic messages allowed to be transmitted using an amount of the second bandwidth allocated to the electronic control device itself, and coordinate transmission of the dynamic messages to the communication bus such that the number of the dynamic messages transmitted to the communication bus per unit time does not exceed the upper limit.

2. The communication network system according to claim 1, wherein each of the electronic control devices transmits the dynamic messages to be transmitted to the communication bus with information indicating that there are dynamic messages that have not been transmitted yet added to the dynamic messages when transmitting some of the dynamic messages that have not been transmitted yet to the communication bus under a situation in which the number of the dynamic messages that have not been transmitted yet to the communication bus, among the dynamic messages that have been generated, is larger than the upper limit.

3. The communication network system according to claim 1, wherein each of the electronic control devices deletes the dynamic messages that have not been transmitted to the communication bus even when an elapsed time since generation exceeds a predetermined time.

* * * * *